(12) United States Patent
Peterson

(10) Patent No.: US 7,052,344 B1
(45) Date of Patent: May 30, 2006

(54) METHOD OF MANUFACTURING INFLATABLE DECKS

(75) Inventor: Leroy L. Peterson, Omaha, NE (US)

(73) Assignee: Sportsstuff, Inc., Omaha, NE (US)

( * ) Notice: Subject to any disclaimer, the term of this patent is extended or adjusted under 35 U.S.C. 154(b) by 0 days.

(21) Appl. No.: 10/963,212

(22) Filed: Oct. 11, 2004

(51) Int. Cl.
*B63B 35/58* (2006.01)
(52) U.S. Cl. .......................... 441/40; 441/67
(58) Field of Classification Search ............ 441/40, 441/66, 67, 129
See application file for complete search history.

(56) References Cited

U.S. PATENT DOCUMENTS

| 2,048,365 | A | * | 7/1936 | Agate et al. ............... 353/43 |
| 3,455,571 | A | * | 7/1969 | Dallera et al. ............. 280/18 |
| 3,490,109 | A | * | 1/1970 | Heimberger ............... 24/389 |
| D287,528 | S | * | 12/1986 | Maxwell et al. ........... D21/803 |
| 5,397,258 | A | * | 3/1995 | Switlik et al. ............. 441/40 |
| 6,216,268 | B1 | * | 4/2001 | Schleicher ................... 2/16 |
| 6,283,811 | B1 | * | 9/2001 | Peterson .................... 441/66 |

\* cited by examiner

*Primary Examiner*—Stephen Avila
(74) *Attorney, Agent, or Firm*—Strum & Fix LLP

(57) ABSTRACT

The present invention provides a method of manufacturing an inflatable deck by sealing a top and bottom sheet of material at an outer peripheral edge, at spaced intervals interior of and parallel to the outer peripheral edge, and at opposing edges formed when a wedge-shaped section is removed. An air inlet valve is fitted in one of the top or bottom sheets. The deck may be circular, square, rectangular, or polygonal in shape. When the deck is inflated it has flat top and bottom surfaces.

20 Claims, 3 Drawing Sheets

METHOD OF MANUFACTURING INFLATABLE DECKS

BACKGROUND OF THE INVENTION

1. Field of the Invention

The present invention relates to the field of manufacturing inflatables, and more particularly to methods for manufacturing inflatable decks.

2. Description of Related Art

The traditional way to produce inflatable decks that present flat surfaces when inflated is to rely on an I-beam connector web that extends between and connects a top and bottom sheet of material. The I-beam web evenly pulls two top and bottom sheets together so they will stay in a flat, untwisted shape when the deck is inflated. I-beam webs are found in many inflatable decks of various shapes. Using an I-beam connecting web, however, involves numerous manufacturing steps and requires additional materials and is therefore relatively costly. If the top and bottom sheets are bonded directly together to form an X-beam construction, the additional material for the web and the resulting manufacturing steps are not required since the X-beam is formed by simply heat sealing the top and bottom sheets together with a press. Unfortunately, when using a conventional X-beam construction, the deck becomes twisted when inflated and does not present flat top and bottom surfaces as required.

As a consequence of the foregoing situation, there has existed a longstanding need for a new and improved method of manufacturing an inflatable deck, and the provision of such a method is a stated objective of the present invention.

BRIEF SUMMARY OF THE INVENTION

Briefly stated, the present invention provides a method of manufacturing an inflatable deck by sealing a top and bottom sheet of material at an outer peripheral edge, at spaced intervals interior of and parallel to the outer peripheral edge, and at opposing edges formed when a wedge-shaped section is removed. An air inlet valve is fitted in one of the top or bottom sheets. The deck may be circular, square, rectangular, or polygonal in shape. When the deck is inflated it has flat top and bottom surfaces.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
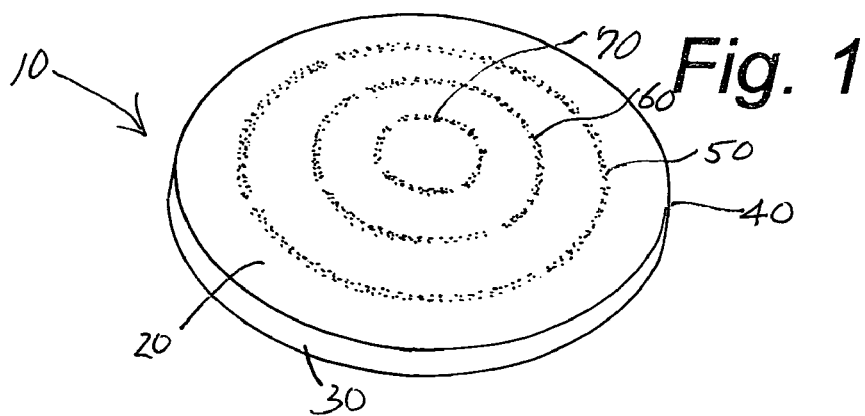
FIG. 1 is a perspective view of an inflatable deck of the present invention having a circular shape.

As can be seen by reference to the drawings, and in particular to FIG. 1, an inflatable deck made by the method that forms the basis of the present invention is designated generally by the reference number 10.

Figure 2:
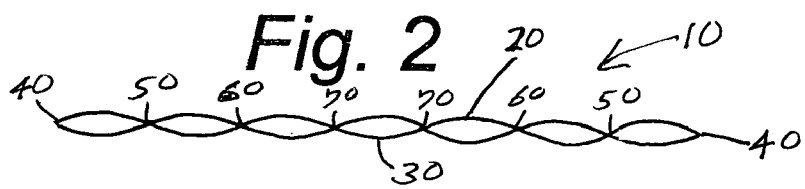
FIG. 2 is a schematic view illustrating the X-beam construction used in the present invention.

The present invention provides a simple, but total, solution to keep an inflatable deck properly flat after being inflated. Moreover, the method saves processing time and materials. Instead of using an I-beam web, an X-beam construction is used as illustrated in FIG. 2 where a top sheet 20 and a bottom sheet 30 are sealed directly together at an outer peripheral edge 40, and at spaced intervals 50, 60, and 70 interior of the outer edge 40.

Figure 3:
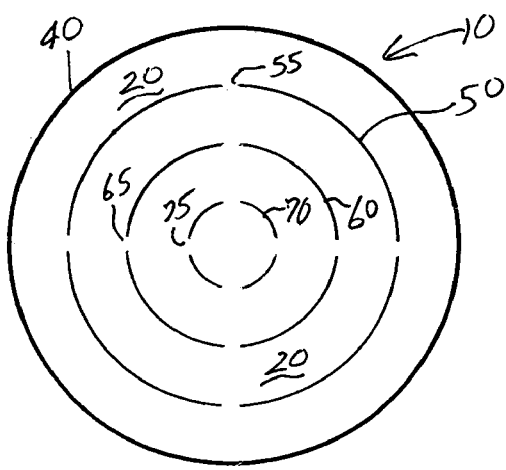
FIGS. 3–5 are top plan views illustrating the removal of a wedge-shaped section and sealing of the opposing edges left by the removal to form an inflatable deck construction having a circular shape.
Figure 4:
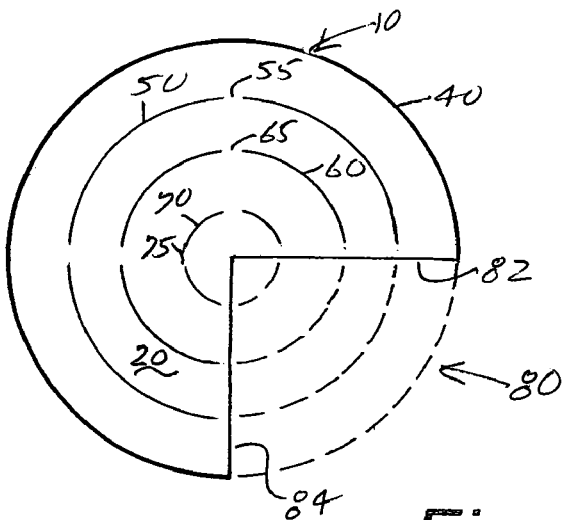
Figure 5:
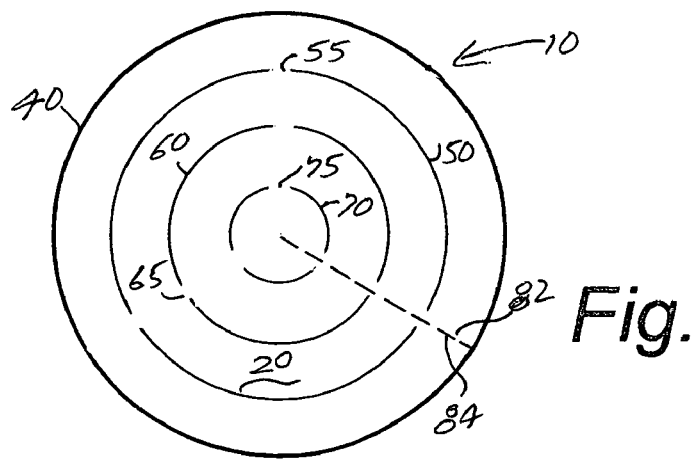
Figure 6:
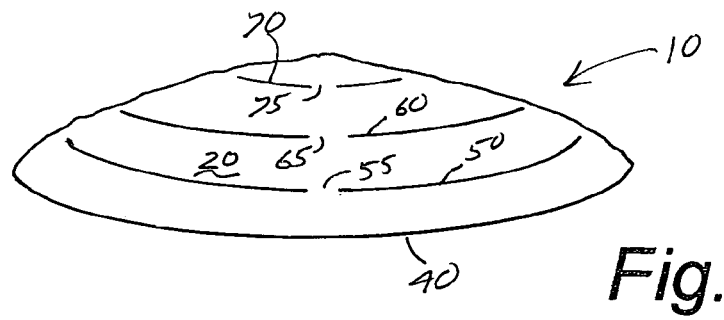
FIG. 6 is a perspective view of the circular deck construction in its uninflated state.

FIGS. 3–5 illustrate the method for manufacturing circular inflatable decks 10. The circular top sheet 20 and the circular bottom sheet 30 are first sealed at the outer peripheral edge 40 and at spaced intervals 50, 60, and 70 as illustrated in FIG. 3. Gaps 55, 65, and 75 are left in the sealed intervals to allow air to communicate freely in the formed chambers. A wedge shaped section 80 is then removed (FIG. 4), leaving opposing edges 82 and 84 which are then sealed together (FIG. 5). This results in a deck construction having a domed shaped when uninflated (FIG. 6), but a deck 10 having flat top and bottom surfaces when inflated (FIG. 1).

Figure 7:
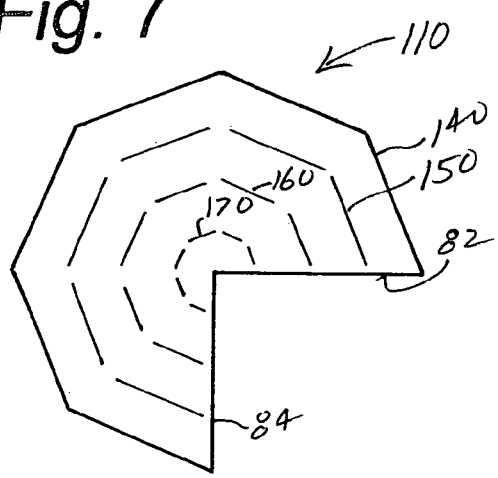
FIG. 7 is a top plan view similar to FIG. 4, but for a deck having a polygonal shape.
Figure 8:
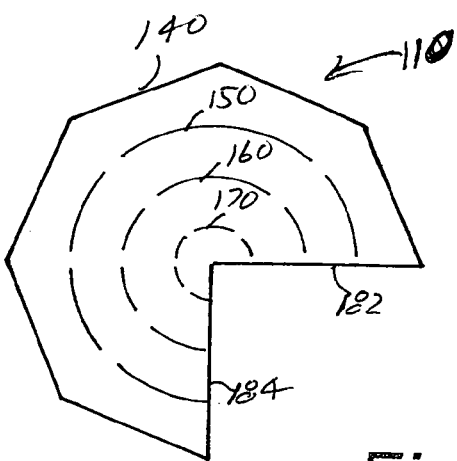
FIG. 8 is a top plan view similar to FIG. 7, but where the spaced intervals interior of the outer peripheral edge are circular.

FIGS. 7 and 8 illustrate a polygon shaped deck 110 where the spaced intervals 150, 160, and 170 are either sealed as straight lines (FIG. 7) or arcs (FIG. 8). Opposing edges 182 and 184 are then sealed together as with the circular deck 10.

Figure 9:
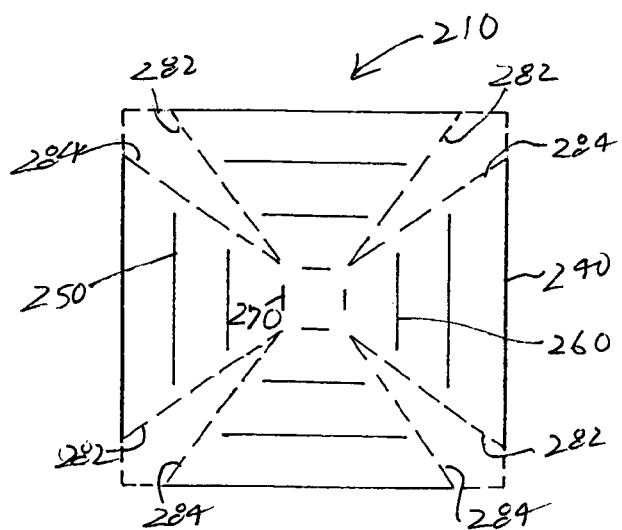
FIG. 9 is a top plan view illustrating the removal of wedge-shaped sections for a deck with a square shape.

A square shaped deck 210 illustrated in FIG. 9 has four wedge shaped sections removed leaving opposing edges 282 and 284 that are sealed together to form the square deck 210.

Figure 10:
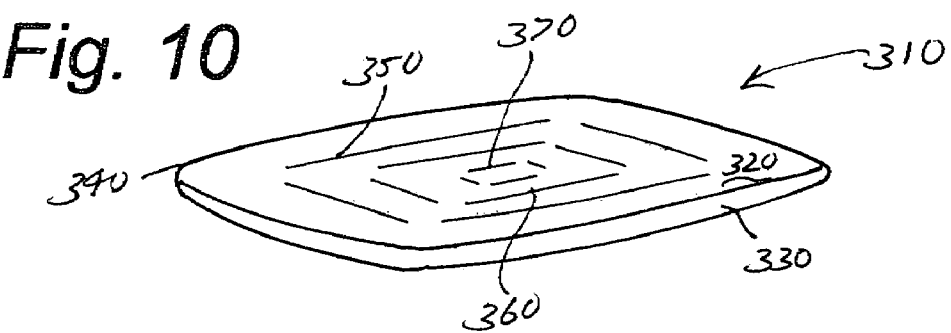
FIG. 10 is a perspective view of a deck having a rectangular shape.
Figure 11:
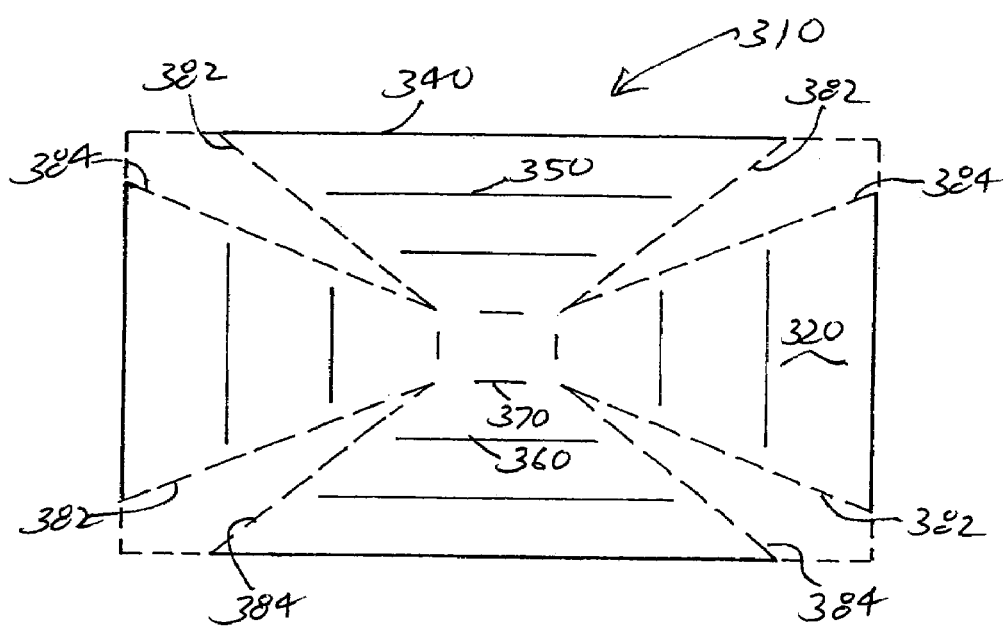
FIG. 11 is a top plan view illustrating the removal of wedge-shaped sections for a rectangular deck.
Figure 12:
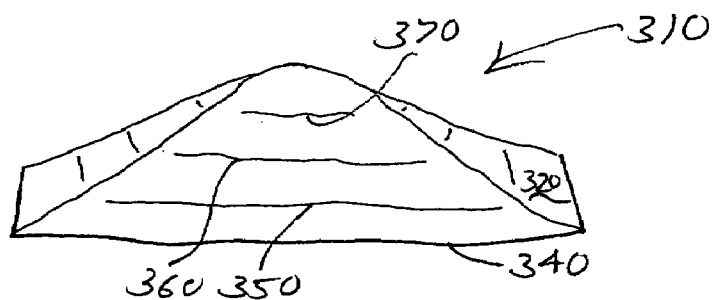
FIG. 12 is a perspective view of the rectangular deck construction in its uninflated state.

FIGS. 10–12 illustrate a rectangular deck 310 with four wedge shaped sections removed leaving opposing edges 382 and 384 that are sealed together to form the square deck 310 illustrated in the domed uninflated state (FIG. 12) and the inflated state (FIG. 10) where the top and bottom surfaces are flat.

All of the above constructions use the X-beam connecting system with wedge shaped sections removed that results in dome shaped uninflated deck, and inflated decks that have flat top and bottom surfaces.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A method of manufacturing an inflatable deck, comprising the steps of:
   providing a top sheet of material and a bottom sheet of material;
   providing an air inlet valve to one of the top and bottom sheets;
   sealing the top and bottom sheets together to form a sealed outer peripheral edge;
   sealing the top and bottom sheets together at a spaced interval interior of the outer peripheral edge;
   cutting away a wedge shaped section of the sealed top and bottom sheets leaving first and second opposing edges; and
   sealing the first and second opposing edges together to form a closed bladder.

2. The method of claim 1 wherein the outer peripheral edge is in the shape of a circle having a center.

3. The method of claim 2 wherein the first and second opposing edges extend from the center of the circle to the outer peripheral edge.

4. The method of claim 3 wherein the wedge shaped section defines a quadrant of the circle.

5. The method of claim 1 further including the step of sealing the top and bottom sheets together at a plurality of spaced intervals interior of the outer peripheral edge.

6. The method of claim 5 wherein the outer peripheral edge is in the shape of a circle having a center.

7. The method of claim 6 wherein the outer peripheral edge is in the shape of a circle having a center.

8. The method of claim 7 wherein the wedge shaped section defines a quadrant of the circle.

9. The method of claim 1 wherein the outer peripheral edge is in the shape of a polygon having a center.

10. The method of claim 9 wherein the first and second opposing edges extend from the center to the outer peripheral edge.

11. The method of claim 10 wherein the wedge shaped section defines a quadrant of the polygon.

12. The method of claim 11 further including the step of sealing the top and bottom sheets together at a plurality of spaced intervals interior of the outer peripheral edge.

13. The method of claim 1 wherein the outer peripheral edge is in the shape of a square.

14. The method of claim 1 wherein the outer peripheral edge is in the shape of a rectangle.

15. An inflatable deck construction comprising:
    a top sheet of material and a bottom sheet of material sealed together at an outer peripheral edge, at a spaced interval interior of the outer peripheral edge, and at opposing edges of a removed wedge shaped section; and
    an air inlet valve attached to one of the top and bottom sheets.

16. The construction of claim 15 wherein the outer peripheral edge is in the shape of a circle having a center.

17. The construction of claim 16 wherein the first and second opposing edges extend from the center of the circle to the outer peripheral edge.

18. The construction of claim 17 wherein the wedge shaped section defines a quadrant of the circle.

19. The construction of claim 15 wherein the top and bottom sheets are sealed together at a plurality of spaced intervals interior of the outer peripheral edge.

20. The construction of claim 15 wherein the outer peripheral edge is in the shape of a polygon having a center.

* * * * *